United States Patent
Flynn et al.

(10) Patent No.: US 8,189,964 B2
(45) Date of Patent: May 29, 2012

(54) MATCHING AN APPROXIMATELY LOCATED QUERY IMAGE AGAINST A REFERENCE IMAGE SET

(75) Inventors: John Flynn, Marina Del Rey, CA (US);
Ulrich Buddemeier, Venice, CA (US);
Henrik Stewenius, Zurich (CH);
Hartmut Neven, Malibu, CA (US);
Fernando Brucher, Irvine, CA (US);
Hartwig Adam, Marina Del Rey, CA (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 12/632,338

(22) Filed: Dec. 7, 2009

(65) Prior Publication Data
US 2011/0135207 A1    Jun. 9, 2011

(51) Int. Cl.
*G06K 9/36* (2006.01)
*G06K 9/62* (2006.01)

(52) U.S. Cl. ........................................ 382/305
(58) Field of Classification Search ........................ None
See application file for complete search history.

(56) References Cited

U.S. PATENT DOCUMENTS

| | | | |
|---|---|---|---|
| 5,579,471 A * | 11/1996 | Barber et al. | 715/700 |
| 5,926,116 A * | 7/1999 | Kitano et al. | 340/988 |
| 6,055,536 A * | 4/2000 | Shimakawa et al. | 1/1 |
| 6,115,717 A | 9/2000 | Mehrotra et al. | |
| 6,222,939 B1 | 4/2001 | Wiskott et al. | |
| 6,272,231 B1 | 8/2001 | Maurer et al. | |
| 6,301,370 B1 | 10/2001 | Steffens et al. | |
| 6,356,659 B1 | 3/2002 | Wiskott et al. | |
| 6,400,374 B2 | 6/2002 | Lanier | |
| 6,466,695 B1 | 10/2002 | Potzsch et al. | |
| 6,563,950 B1 | 5/2003 | Wiskott et al. | |
| 6,580,811 B2 | 6/2003 | Maurer et al. | |
| 6,714,661 B2 | 3/2004 | Buddenmeier et al. | |
| 6,834,115 B2 | 12/2004 | Maurer et al. | |
| 6,917,703 B1 | 7/2005 | Steffens et al. | |
| 6,940,454 B2 | 9/2005 | Paetzold et al. | |
| 7,050,624 B2 | 5/2006 | Dialameh et al. | |
| 7,050,655 B2 | 5/2006 | Ho et al. | |
| 7,239,760 B2 | 7/2007 | Di Bernardo et al. | |
| 7,565,139 B2 | 7/2009 | Neven, Sr. et al. | |

(Continued)

OTHER PUBLICATIONS

Lowe, D.G., Object Recognition from Local Scale-Invariant Features, Proc. of the International Conference on Computer Vision, Corfu, Sep. 1999, pp. 8.

(Continued)

*Primary Examiner* — Brian P Werner
(74) *Attorney, Agent, or Firm* — Lerner, David, Littenberg, Krumholz & Mentlik, LLP

(57) ABSTRACT

Aspects of the invention pertain to matching a selected image/photograph against a database of reference images having location information. The image of interest may include some location information itself, such as latitude/longitude coordinates and orientation. However, the location information provided by a user's device may be inaccurate or incomplete. The image of interest is provided to a front end server, which selects one or more cells to match the image against. Each cell may have multiple images and an index. One or more cell match servers compare the image against specific cells based on information provided by the front end server. An index storage server maintains index data for the cells and provides them to the cell match servers. If a match is found, the front end server identifies the correct location and orientation of the received image, and may correct errors in an estimated location of the user device.

20 Claims, 9 Drawing Sheets

U.S. PATENT DOCUMENTS

| | | | |
|---|---|---|---|
| 7,577,316 B2 | 8/2009 | Di Bernardo et al. | |
| 7,680,324 B2 * | 3/2010 | Boncyk et al. | 382/165 |
| 7,805,025 B2 | 9/2010 | DiBernardo et al. | |
| 7,813,596 B2 | 10/2010 | Di Bernardo et al. | |
| 7,899,243 B2 * | 3/2011 | Boncyk et al. | 382/165 |
| 7,899,252 B2 * | 3/2011 | Boncyk et al. | 382/181 |
| 7,917,286 B2 * | 3/2011 | Taylor et al. | 701/208 |
| 7,962,128 B2 * | 6/2011 | Neven et al. | 455/414.3 |
| 2002/0069218 A1 | 6/2002 | Sull et al. | |
| 2002/0101568 A1 * | 8/2002 | Eberl et al. | 351/211 |
| 2005/0185060 A1 * | 8/2005 | Neven, Sr. | 348/211.2 |
| 2006/0050933 A1 | 3/2006 | Adam et al. | |
| 2006/0251339 A1 * | 11/2006 | Gokturk et al. | 382/305 |
| 2009/0070415 A1 | 3/2009 | Kishi et al. | |
| 2011/0044543 A1 * | 2/2011 | Nakamura et al. | 382/190 |

OTHER PUBLICATIONS

International Search Report and Written Opinion, PCT/US2010/059207, dated Jul. 28, 2011.

* cited by examiner

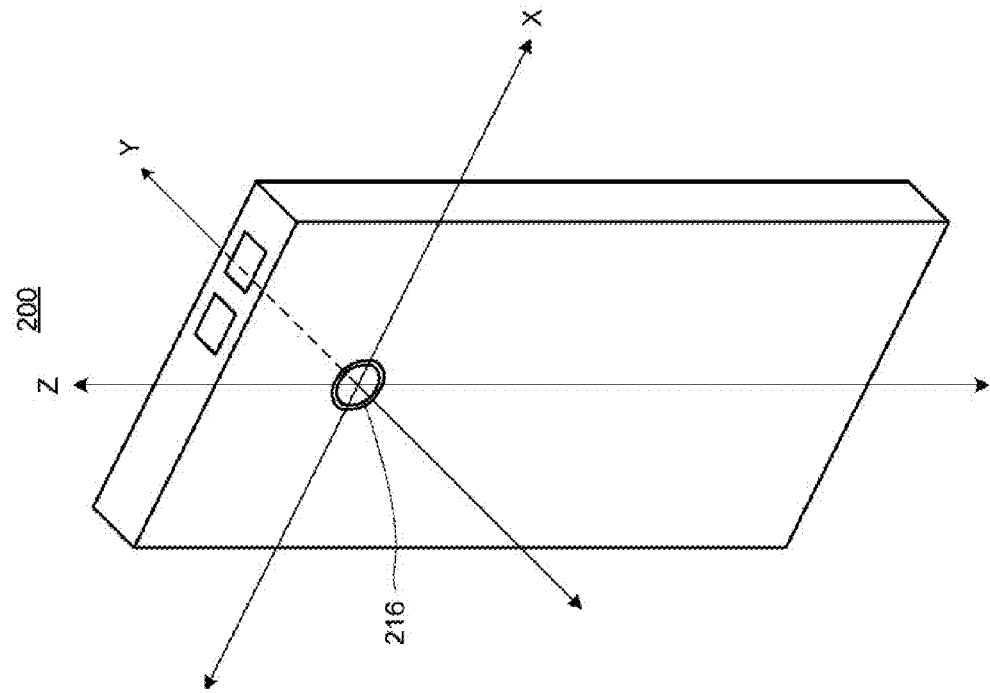
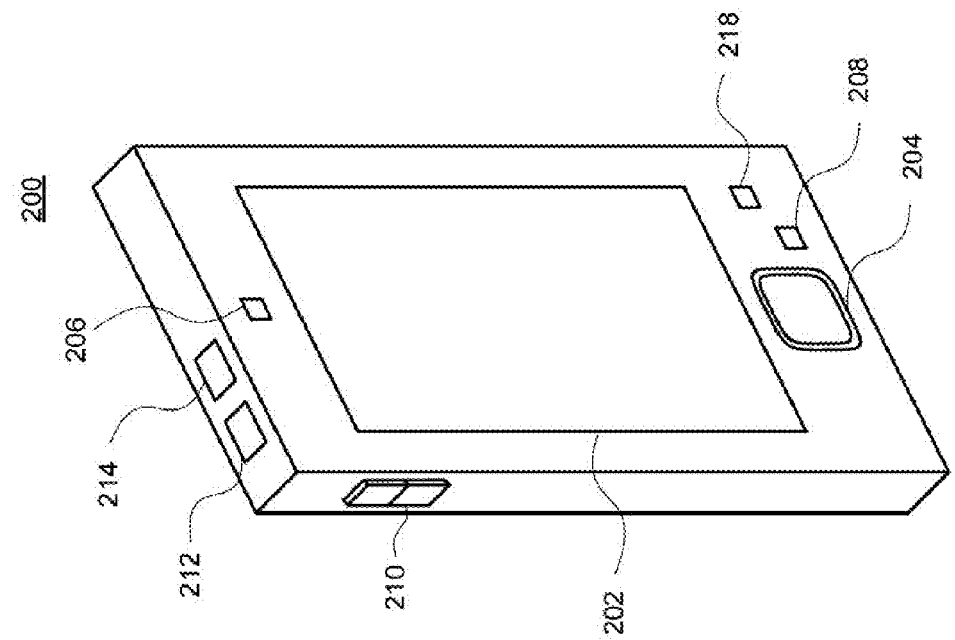

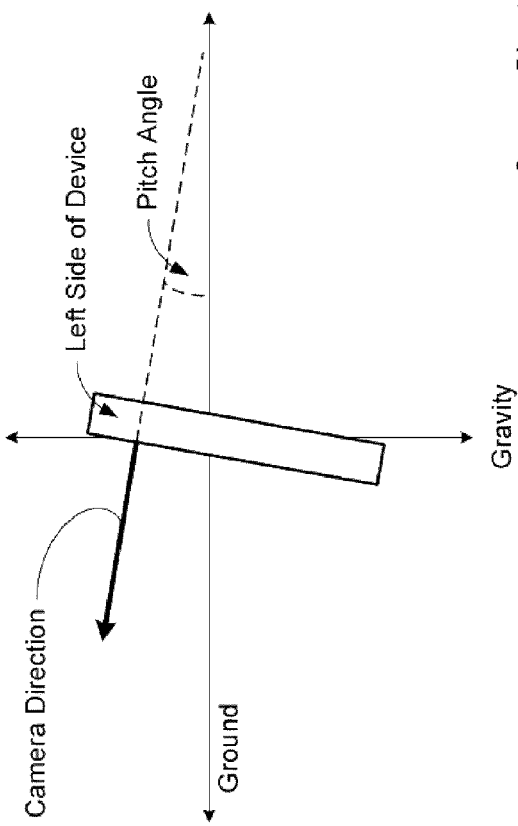
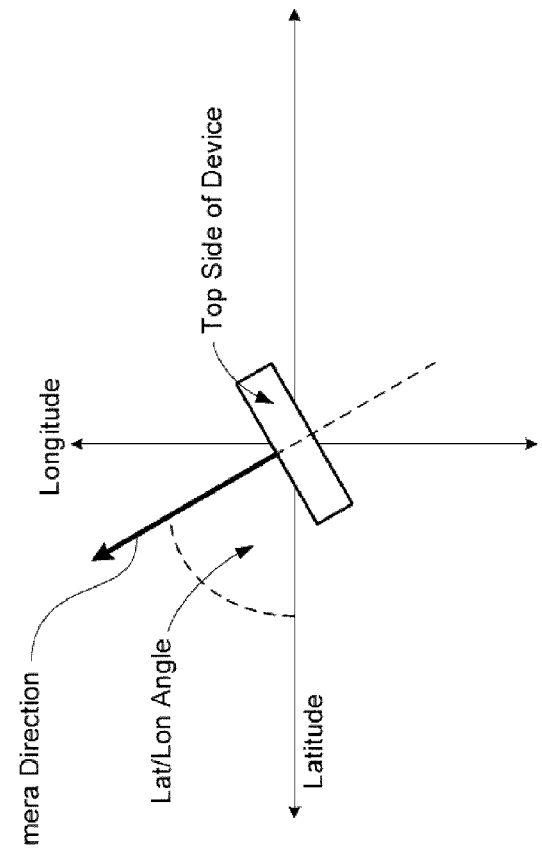

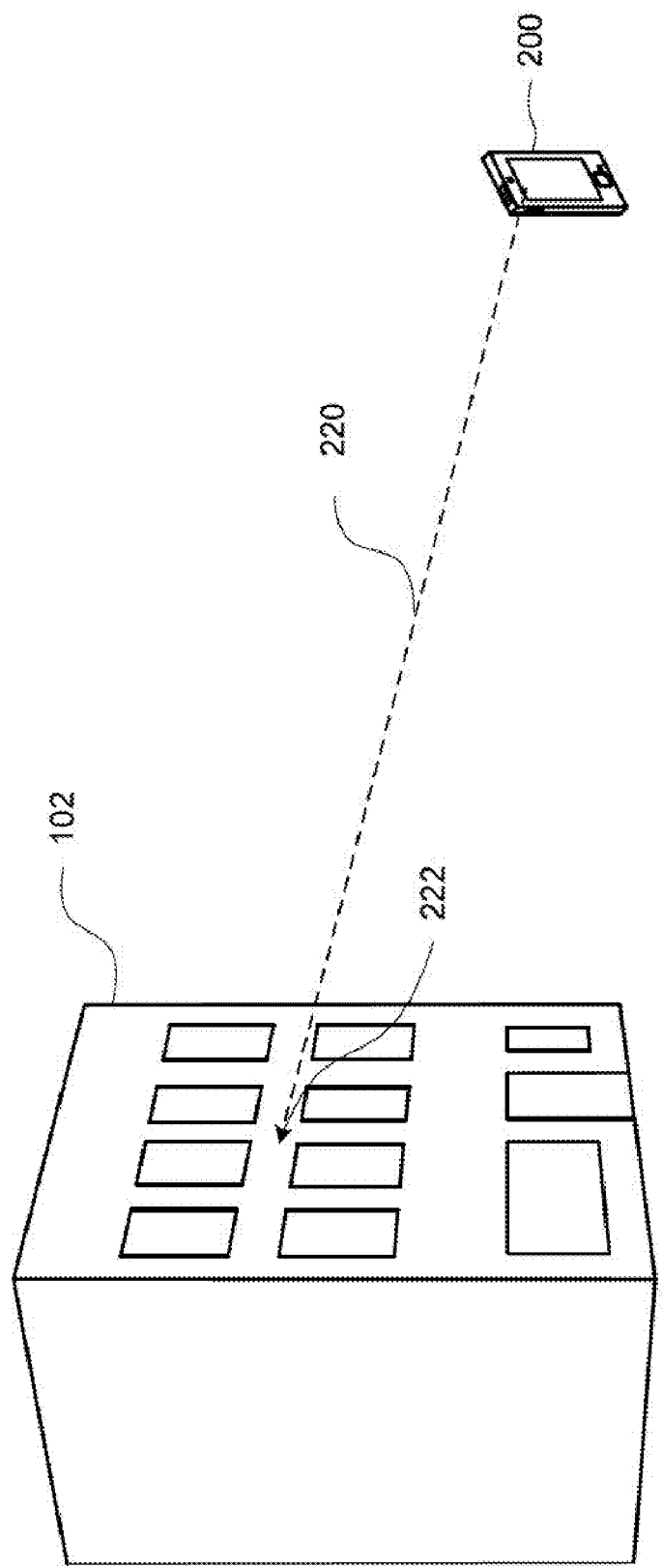

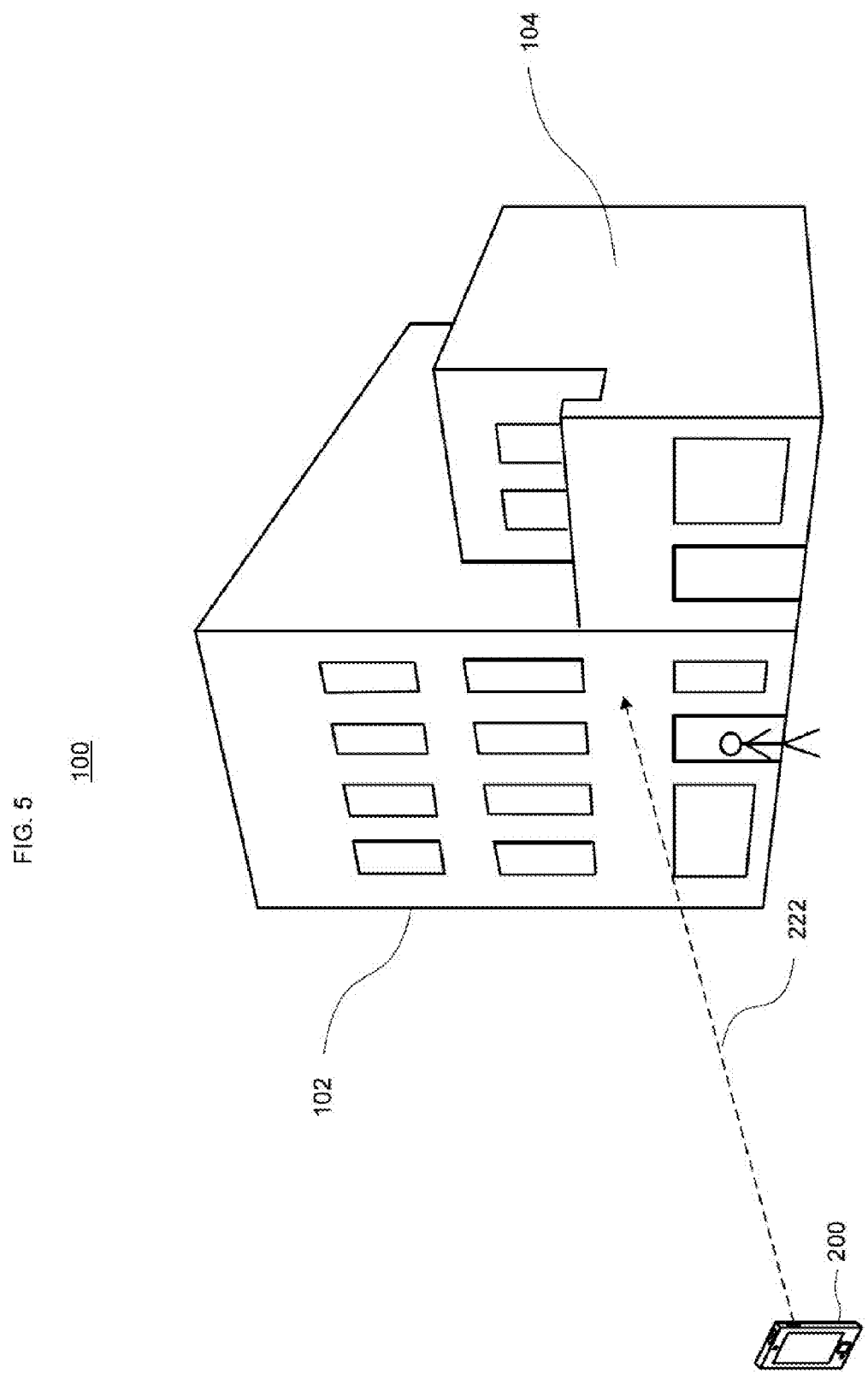

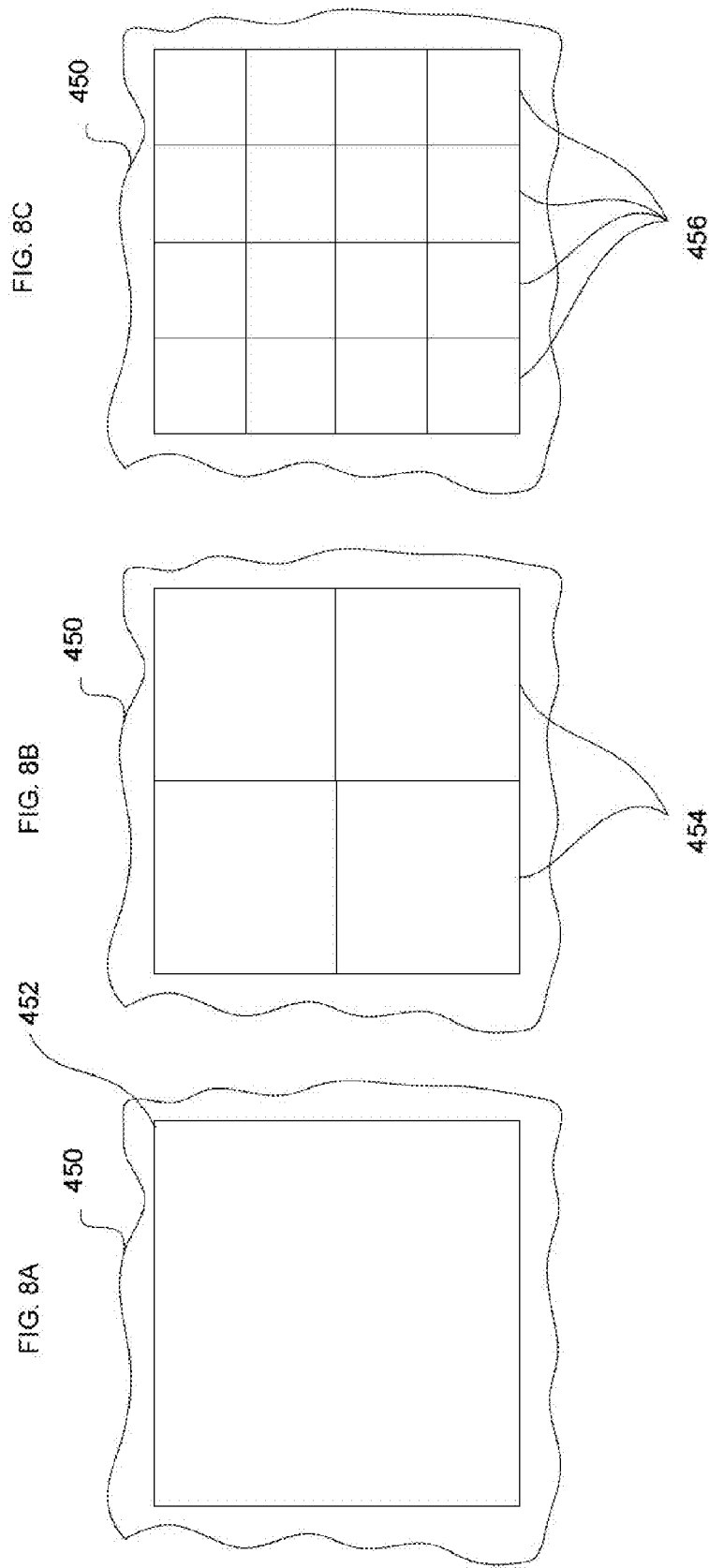

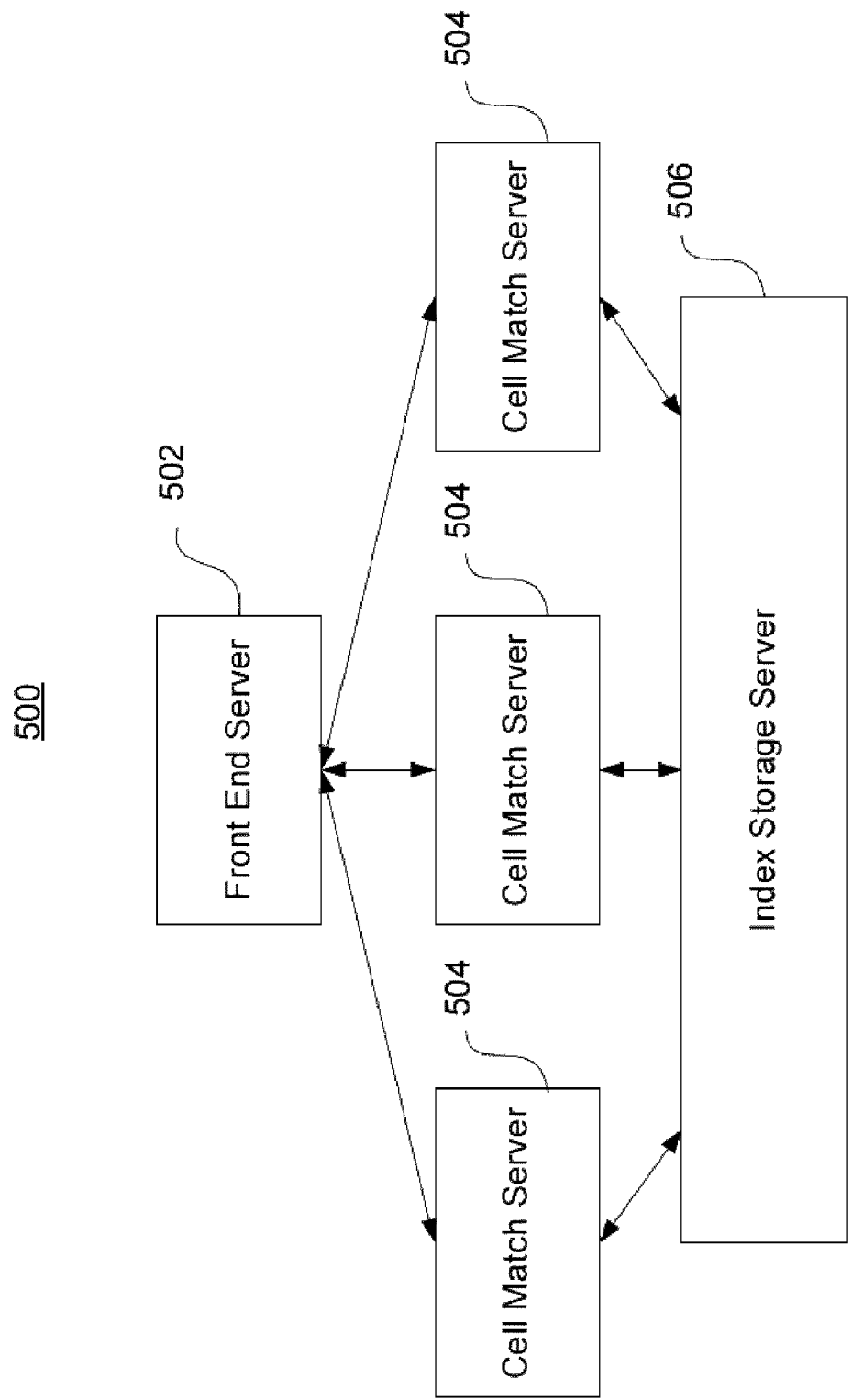

MATCHING AN APPROXIMATELY LOCATED QUERY IMAGE AGAINST A REFERENCE IMAGE SET

BACKGROUND OF THE INVENTION

1. Field of the Invention

Aspects of the invention relate generally to digital imagery. More particularly, aspects are directed to matching a received image with geolocation information against selected reference images.

2. Description of Related Art

Mobile user devices such as cellular telephones and personal digital assistants ("PDAs") often include digital cameras among other features. Such devices marry the benefits of wireless access with electronic photography. A user may take pictures of friends and family, points of interest, etc., and share those pictures instantly.

Image recognition can be used on the pictures. For instance, applications such as mobile visual search programs may analyze these pictures in an attempt to identify features such as points of interest and the like. However, mobile visual searching can be computationally intensive as well as time consuming, and depending on the device that captures the image, may rely on incomplete or inaccurate location information associated with the image. Aspects of the invention address these and other problems.

SUMMARY OF THE INVENTION

In one embodiment, an image processing method is provided. The method comprises receiving an image request from a user device, the image request including an image of interest and location metadata for the image of interest; analyzing the location metadata to select one or more cells to evaluate against the image of interest, each cell having one or more geolocated images and index data associated therewith; for each selected cell, comparing the image of interest against the index data of that cell; identifying any matches from the geolocated images of the selected cells based on the compared index data; and providing the matches.

In one alternative, the matches are provided along with a match confidence indicator that identifies a likelihood or accuracy of each match. Here, a value of the match confidence indicator desirably depends on geolocation verification between the location metadata and location information for the geolocated images of the selected cells.

In another alternative, updated location metadata for the image of interest is provided to the user device along with the matches. In a further alternative, the index data is stored in an index storage server, and the index data for each selected cell is accessed with a key representing that cell's unique ID.

In yet another alternative, the index data corresponds to features of the geolocated images. In one example, the features are selected from the set consisting of corners, edges or lines, brightness information and histogram information. In another example, the geolocated images are stored in an image database and the index data is stored in a cell database. And in a further example, the index data is stored in a k-dimensional tree format. And in one example, each cell has a unique ID derived from geolocation coordinates of that cell.

In another embodiment, an image processing apparatus is provided. The apparatus comprises a front end module and a cell match module. The front end module is configured to receive an image request from a user device. The image request includes an image of interest and location metadata for the image of interest. The front end module is further configured to analyze the location metadata to select one or more cells to evaluate against the image of interest. Each cell has one or more geolocated images and index data associated therewith. The cell match module is configured to compare the image of interest against the index data of the selected cells and to identify any matches from the geolocated images of the selected cells based on the compared index data.

In one example, the cell match module comprises a plurality of cell match servers, and given ones of the cell match servers are assigned to perform the comparison for a corresponding one of the selected cells. Here, the matches may be provided along with a match confidence indicator that identifies a likelihood or accuracy of each match. Alternatively, the apparatus further comprises an indexed module configured to store the index data of each cell. Here, each cell desirably has a unique ID associated therewith. In this case, each given cell match server accesses the index data of the corresponding cell from the indexed module using a key representing the unique ID of that cell. Preferably the unique ID for each cell is derived from geolocation coordinates of that cell.

In a further alternative, the index data corresponds to features of the geolocated images. And in this case, the features are desirably selected from the set consisting of corners, edges or lines, brightness information and histogram information.

BRIEF DESCRIPTION OF THE DRAWINGS

FIGS. 2A-B illustrate a mobile user device in accordance with aspects of the invention.
FIGS. 3A-B illustrate camera angle parameters.
FIG. 4 illustrates an image capture process.
FIG. 5 illustrates an image capture scenario.
FIGS. 8A-C illustrate cell arrangements in accordance with aspects of the invention.
FIG. 9 illustrates an image matching system in accordance with aspects of the invention.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Figure 1:
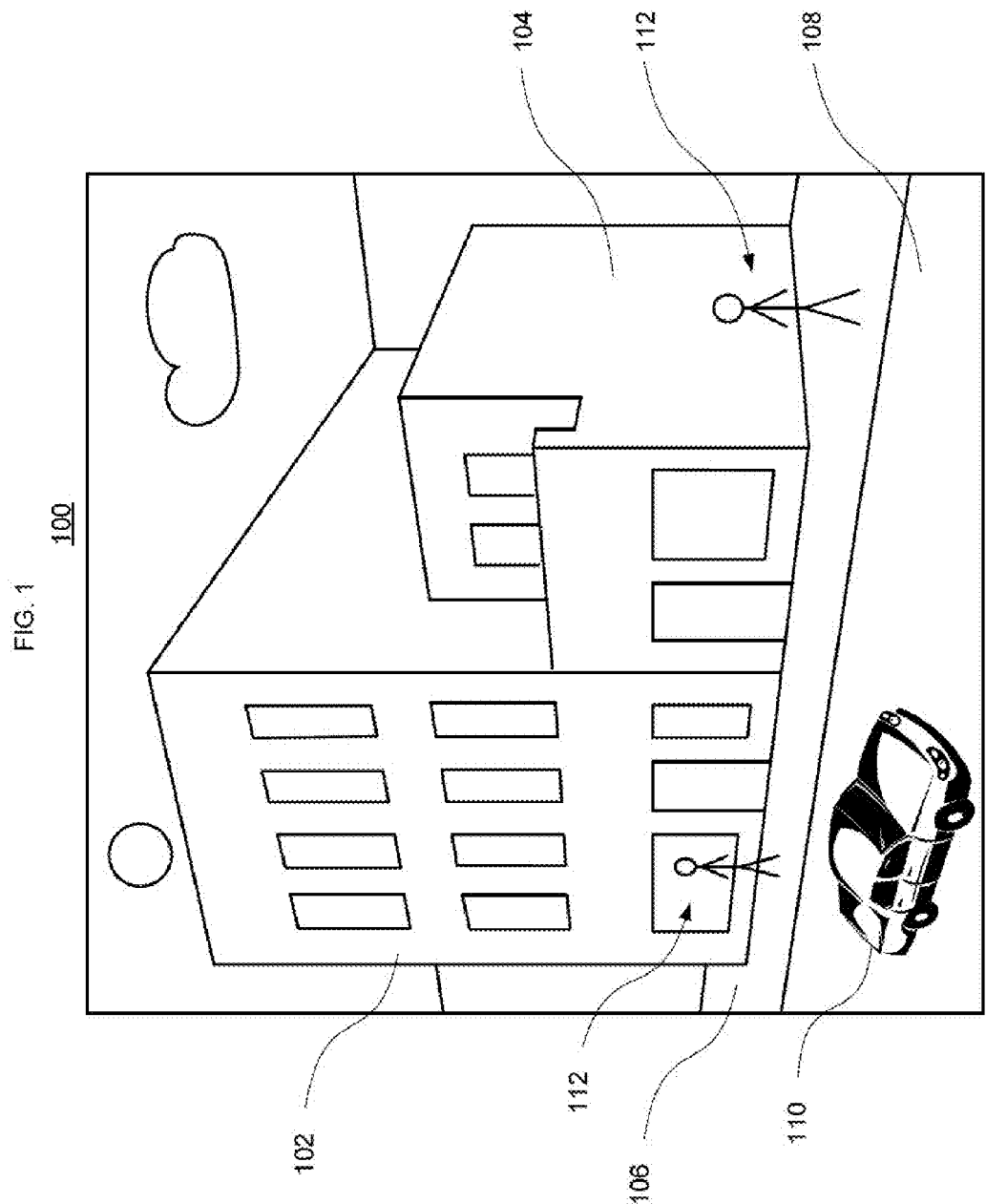
FIG. 1 illustrates an image of interest.

As noted above, users of mobile devices may take pictures of people, places or things of interest. FIG. 1 is an exemplary image 100 which may be captured by a mobile user device. An example of a street level image is an image of geographic objects, people and/or objects that was captured by a camera at an angle generally perpendicular to the ground, or where the camera is positioned at or near ground level. Both the geographic objects in the image and the camera have a geographic location relative to one another. Thus, as shown in FIG. 1, the street level image 100 may represent various geographic objects such as buildings 102 and 104, a sidewalk 106, street 108, vehicle 110 and people 112. It will be understood that while street level image 100 only shows a few objects for ease of explanation, a typical street level image will contain as many objects associable with geographic locations (street lights, signs and advertisements, mountains, trees, sculptures, bodies of water, storefronts, etc.) in as much detail as may be captured by an imaging device such as a digital camera.

In addition to being associated with geographic locations, images such as street level image 100 may be associated with information indicating the orientation of the image. For example, if the street level image comprises a typical photograph, the orientation may simply be the camera angle such as an angle that is 30° east of true north and rises 2° from ground level. If the street level images are panoramic images, such as 360° panoramas centered at the geographic location associated with the image, the orientation may indicate the portion of the image that corresponds with looking due north from the camera position at an angle directly parallel to the ground.

FIGS. 2A-B illustrate a mobile user device 200 that is configured to capture images. As shown in FIG. 2A, the mobile user device 200 may be a PDA or cellular telephone having a touch-screen display 202, general-purpose button 204, speaker 206, and microphone 208 on the front. The left side includes volume button(s) 210. The top side includes an antenna 212 and GPS receiver 214. As shown in FIG. 2B, the back includes a camera 216. The camera may be oriented in a particular direction (hereafter, "camera angle"). And as shown in the front panel of FIG. 2A, a zooming button or other actuator 218 may be used to zoom in and out of an image on the display.

The camera may be any device capable of capturing images of objects, such as digital still cameras, digital video cameras and image sensors (by way of example, CCD, CMOS or other). Images may be stored in conventional formats, such as JPEG or MPEG. The images may be stored locally in a memory of the device 200, such as in RAM or on a flash card. Alternatively, the images may be captured and uploaded into a remote database.

The camera angle may be expressed in three-dimensions as shown by the X, Y and Z axes in FIG. 2B and schematically in FIGS. 3A and 3B. It shall be assumed for ease of understanding and not limitation that the camera angle is fixed relative to the orientation of the device. In that regard, FIG. 3A illustrates a potential pitch of the device (as seen looking towards the left side of the device) relative to the ground, e.g., relative to the plane perpendicular to the direction of gravity.

FIG. 3B illustrates a potential latitude/longitude angle of the device (as seen looking down towards the top side of the device), e.g., the camera direction in which the camera points relative to the latitude and longitude. Collectively, the pitch and latitude/longitude angle define a camera pose or location and orientation. The roll (rotation about the Y axis of FIG. 2B), yaw/azimuth and/or altitude may also be captured. This and other image-related information may be outputted as numerical values by an accelerometer (not shown) or other component in the device 200, used by the device's processor, and stored in the memory of the device.

In one aspect, a user may position the client device 200 with the camera 216 facing an object of interest. In that regard, as shown in FIG. 4, the user may stand in front of an object of interest, such as a building or monument, and orient the camera 216 in a direction 220 that points toward a spot 222 on the point of interest.

The camera 216 of the client device 200 may be used to help the user orient the device to the desired position on the object of interest, here building 102. In this regard, the display 202 may also display a target, bull's-eye or some other indicator to indicate the exact or approximate position of the object at which the device 200 is pointed.

Once an image is captured, the user may elect to share the image with others. Or, alternatively, the user may look for more information about an object in the image. A visual search application may be employed to identify information about the image. Then, relevant information concerning the image may be provided to the user. In a case where the image is sent to others or stored in an external database, the relevant information about the image may also be stored or indexed with the image. However, a primary issue is the proper analysis and classification of the image.

One aspect provides a system and method to match an image with some location information against a database of previously geolocated reference images. As will be explained in detail below, the database of reference images may be split into geographic cells. The received image is matched against a subset of those cells.

When a user takes a picture of an object of interest such as a building (e.g., a storefront) using his or her mobile device, it is desirable to quickly identify information about that building. In the example of FIG. 5, the camera on the mobile user device 200 takes a picture of the building 102.

The GPS unit of the device 200 may provide a rough location of where the picture was taken. However, the device's GPS sensor may not be accurate enough to disambiguate at the individual building level. In addition, the device may not always record or provide an orientation/direction, which may be needed to determine which direction the device's camera is pointing. And even if the orientation/direction is provided, it may not be very accurate. Thus, in the example of FIG. 5, it is possible for the wrong building to be identified (e.g., building 104), or for a background building to be identified instead of a person or a foreground object, or vice versa. In order to overcome such problems, one aspect of the invention matches the photograph against a database of reference images.

Figure 6:
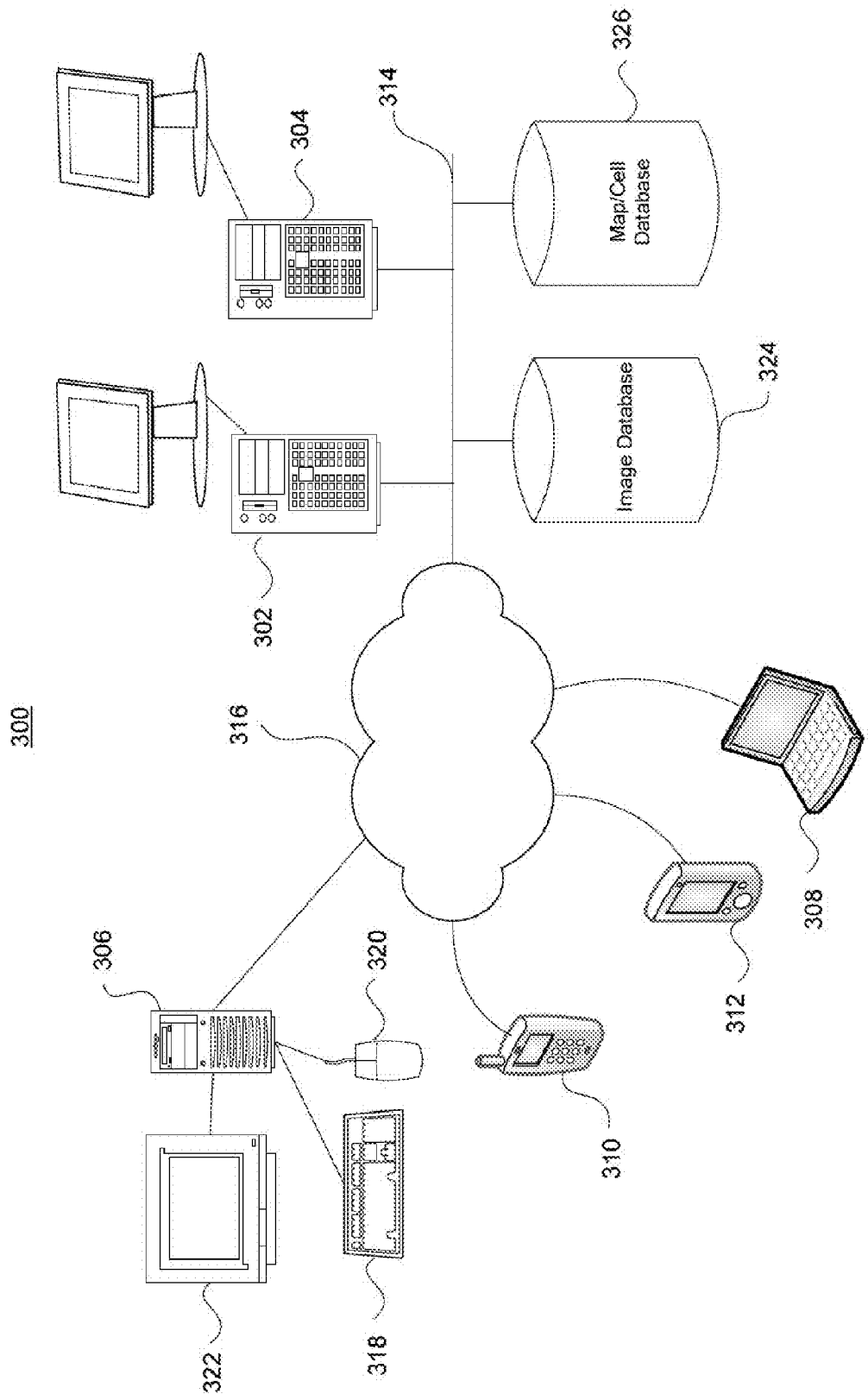
FIG. 6 illustrates a computer system for use with aspects of the invention.

A system comprising image and/or map databases may be employed. As shown in FIG. 6, system 300 presents a schematic diagram depicting various computing devices that can be used alone or in a networked configuration in accordance with aspects of the invention. For example, this figure illustrates a computer network having a plurality of computers 302, 304 and 306 as well as other types of devices such as mobile user devices such as a laptop/palmtop 308, mobile phone 310 and a PDA 312. The mobile user devices may include the components discussed above with regard to mobile user device 200. Various devices may be interconnected via a local bus or direct connection 314 and/or may be coupled via a communications network 316 such as a LAN, WAN, the Internet, etc. and which may be wired or wireless.

Each computer device may include, for example, user inputs such as a keyboard 318 and mouse 320 and/or various other types of input devices such as pen-inputs, joysticks, buttons, touch screens, etc., as well as a display 322, which could include, for instance, a CRT, LCD, plasma screen monitor, TV, projector, etc. Each computer 302, 304, 306 and 308 may be a personal computer, server, etc. By way of example only, computer 306 may be a personal computer while computers 302 and 304 may be servers. Databases such as image database 324 and map database 326 may be accessible to one or more of the servers or other devices.

Figure 7:
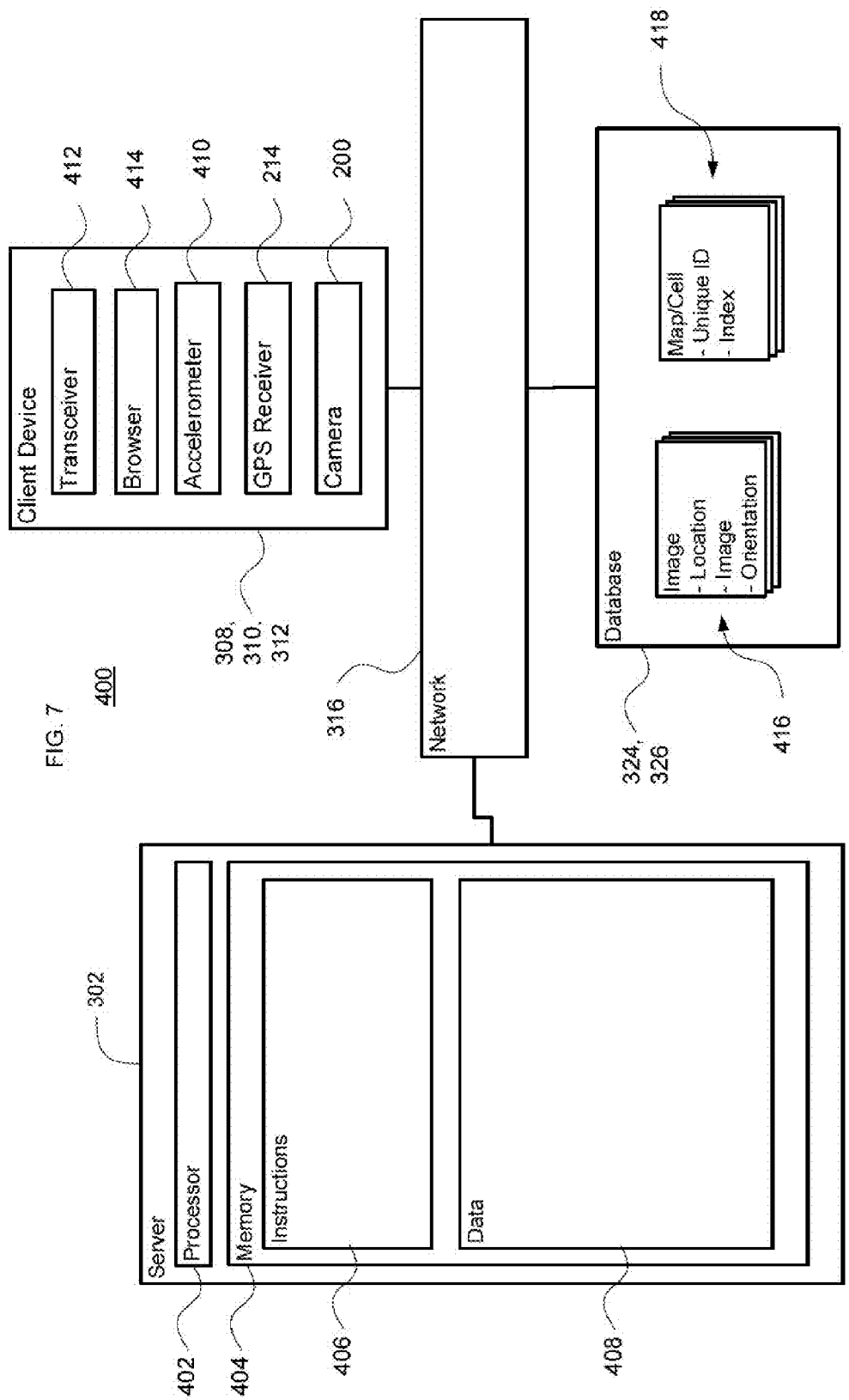
FIG. 7 illustrates aspects of the computer system of FIG. 6.

As shown in diagram 400 of FIG. 7, the devices contain a processor 402, memory/storage 404 and other components typically present in a computer. Memory 404 stores information accessible by processor 402, including instructions 406 that may be executed by the processor 402. It also includes data 408 that may be retrieved, manipulated or stored by the processor. The memory may be of any type capable of storing information accessible by the processor, such as a hard-drive, memory card, ROM, RAM, DVD, CD-ROM, Blu-ray™ Disc, write-capable, and read-only memories. The processor 402 may be any well-known processor, such as processors from Intel Corporation or Advanced Micro Devices. Alternatively, the processor may be a dedicated controller such as an ASIC.

The instructions 406 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. For example, instructions 406 may include image processing programs for analyzing received imagery. Functions, methods and routines of the instructions are explained in more detail below.

Data 408 may be retrieved, stored or modified by processor 402 in accordance with the instructions 406. For instance, although systems and methods according to aspects of the invention are not limited by any particular data structure, the data may be stored in computer registers, in a relational database as a table having a plurality of different fields and records, XML documents, or flat files. The data may also be formatted in any computer-readable format. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Although FIG. 7 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on a removable CD-ROM or DVD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 302 is a server communicating with one or more mobile user devices 308, 310 or 312 and a database such as image database 324 or map database 326. For example, computer 302 may be a web server or application server. Each mobile user device may be configured similarly to the server 302, with a processor, memory and instructions. Each mobile user device may also include a wireless transceiver (e.g., cellular telephone transceiver, Bluetooth, 802.11-type modem or WiFi). As shown in FIG. 7, the database(s) desirably stores images 416, including, for example, the location and orientation (if known) of each image, and/or maps or cells 418. The maps/cells may each have an index and a unique ID.

In addition to having a processor, memory, a display and the like, the mobile user devices 308, 310 and 312 desirably also include the camera 200, GPS receiver 214, an accelerometer 410 and, a transceiver 412 for communication with a network or individual remote devices. A browser 414 or other user interface platform may work in conjunction with the display and user input(s).

In accordance with one aspect of the invention, in order to determine whether an object of interest is a place such as a building, the picture is matched against a database of images from the approximate geographic region where the picture was taken. To keep the matching tractable, any location information (e.g., GPS coordinates) received from the mobile user device that is associated with the image may be used. Thus, the device's GPS coordinates may be used as a rough guide to pick an appropriate set of imagery from the database. Then, that imagery can be matched against the image from the user's device.

Once the received image is matched to a known image, a more refined location can be associated with the received image. Or, alternatively, the location and orientation of the mobile user device can be corrected. This may be done by solving for the relative pose or relative location and orientation of the received image based on correspondences with image information from the database. Alternatively, the known position and orientation of the reference image(s) may be used directly. This information may be updated at the device itself, may be maintained in the network (e.g., by server 302), or both. Additionally, if there is a strong match against a building or other point of interest, then it is likely that the user is interested in that point of interest.

The image processing may be split into two parts. One is index building. The other is matching against a pre-build index. FIGS. 8A-C illustrate one way to perform index building. First, as shown in FIG. 8A, a region 450 may include a geographic cell 452. One or more images is associated with the cell 452. As used herein, a "cell" includes a delimited geographic area at some point on the Earth. Cells may be of varying sizes. For instance, cells may be on the order of 10s to 100s of meters on each side. Depending upon the amount of information available, the region 450 may be split into smaller cells. Thus, as shown in FIG. 8B, it may have four cells 454. Or as shown in FIG. 8C, it may have sixteen cells 456. In one example, there may be dozens or hundreds of images associated with a given cell.

The imagery of each cell has certain features. For instance, each image may be associated with location information such as latitude/longitude, orientation and height. The image also includes image details. The images details may include corners, edges or lines, brightness changes, histograms or other image filtering outputs from known image processing techniques. Some or all of these features may be extracted from the images and stored in an index for the given cell. The database(s) may store the imagery itself in a known image format such as JPEG. The index and cell information may be stored in any convenient format. Although the invention is not limited by any particular data structure, the data may be stored in computer registers, in a relational database as a table having a plurality of different fields and records, XML documents or flat files such as keyhole flat files. The indexed features are desirably stored in a form that allows fast comparison with query features, such as a k-dimensional tree (kd-tree).

Each cell preferably also has a unique ID associated with it. For instance, the unique ID may be derived from the coordinates of the cell (e.g., the center latitude/longitude of the cell). A received image may be quickly matched against a given index. By way of example only, the indices may be written to a key-value store database, where the key is the cell's unique ID. Here, the value is the created index for the given cell.

The database may also take into account the directed that the reference image(s) is facing. Discrete compass directions may be used. Here, a separate index may be created for each direction.

FIG. 9 illustrates a system 500 for performing image matching once indices have been built. The system 500 comprises modules for handling different aspects of the image matching. The system 500 preferably includes a first module, shown as comprising a front end server 502. A cell match module may comprise one or more cell match servers 504. And an indexed module comprises an index storage server, 506. Each of these servers may be configured as described above with the server 302 shown in FIGS. 6 and 7. While not shown, the index storage server 506 may be coupled to image database 324 and map/cell database 326. While the servers are shown as discrete devices, it is possible to employ a single machine having multiple subprocessors operating as the different servers.

The front end server 502 receives an image/match request, for instance from an application or interface on the mobile user device. The request includes an image and corresponding metadata about the image's geographical location and orientation (if available). The front end server 502 uses the image's received location information, plus an estimate of any possible error in the location information, to determine a small subset of cells to match the image against.

The image matching is conducted by one or more cell match servers 504. Matching against cells can occur in parallel using many cell match servers 504. Each cell match server 504 is provided the received image and the key of a cell that it should match the received image against. A given cell match server 504 will then query one or more index storage servers 506 to access the index data for the given cell.

Each cell match server 504 matches the received image against its respective index data. One or more matching references (if any) are returned to the front end server 502. These results preferably include a match confidence indicator. In addition, the cell match server 504 may determine and return an improved/corrected position and orientation for the received image.

The cell match server 504 may use the mobile user device's location and/or orientation sensors to perform geolocation verification on any matches. If a match result indicates a location and orientation that is very different than that reported by the device's sensor(s), then the match confidence assigned to that result may be lowered accordingly.

The index storage server(s) 506 receive the key/unique ID and return any associated data. As the index may be very large (e.g., hundreds or thousands of gigabytes of data), different subsets of data may be stored on different computers or in different datacenters. The correct data subset or partition (a shard) for a given index key may be determined using a hashing scheme.

The front end server 502 is configured to collate results returned by the cell match servers 504. The front end server may threshold the match scores provided by the cell match servers. The result(s) with the highest correlation and/or confidence is (are) identified as a (possible) match.

As discussed above, the results may be used to provide corrected location information to the mobile user device. They may also be used to provide enhanced content to the device. For instance, information may be provided about the point of interest in the image. Or supplemental content regarding nearby buildings and attractions may be given, such as via a local listing or Yellow Pages application. The results may also be used in an augmented reality application.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. An image processing method, comprising:
   receiving an image request from a user device, the image request including an image of interest and location metadata for the image of interest;
   analyzing the location metadata to select one or more cells to evaluate against the image of interest, each cell having one or more geolocated images and index data associated therewith;
   for each selected cell, comparing the image of interest against the index data of that cell;
   identifying any matches from the geolocated images of the selected cells based on the compared index data; and
   providing the matches;
   wherein the matches are provided along with a match confidence indicator that identifies a likelihood or accuracy of each match; and
   wherein a value of the match confidence indicator depends on geolocation verification between the location metadata and location information for the geolocated images of the selected cells.

2. The image processing method of claim 1, wherein updated location metadata for the image of interest is provided to the user device along with the matches.

3. The image processing method of claim 1, wherein the index data is stored in an index storage server, and the index data for each selected cell is accessed with a key representing that cell's unique ID.

4. The image processing method of claim 1, wherein the index data corresponds to features of the geolocated images.

5. The image processing method of claim 4, wherein the features are selected from the set consisting of corners, edges or lines, brightness information and histogram information.

6. The image processing method of claim 4, wherein the geolocated images are stored in an image database and the index data is stored in a cell database.

7. The image processing method of claim 4, wherein the index data is stored in a k-dimensional tree format.

8. The image processing method of claim 1, wherein each cell has a unique ID derived from geolocation coordinates of that cell.

9. An image processing apparatus, comprising:
   a front end module configured to receive an image request from a user device, the image request including an image of interest and location metadata for the image of interest, the front end module being further configured to analyze the location metadata to select one or more cells to evaluate against the image of interest, each cell having one or more geolocated images and index data associated therewith; and
   a cell match module configured to compare the image of interest against the index data of the selected cells and to identify any matches from the geolocated images of the selected cells based on the compared index data;
   wherein the cell match module comprises a plurality of cell match servers, and given ones of the cell match servers are assigned to perform the comparison for a corresponding one of the selected cells.

10. The image processing apparatus of claim 9, wherein the matches are provided along with a match confidence indicator that identifies a likelihood or accuracy of each match.

11. The image processing apparatus of claim 9, further comprising an indexed module configured to store the index data of each cell.

12. The image processing apparatus of claim 11, wherein each cell has a unique ID associated therewith, and each given cell match server accesses the index data of the corresponding cell from the indexed module using a key representing the unique ID of that cell.

13. The image processing apparatus of claim 12, wherein the unique ID for each cell is derived from geolocation coordinates of that cell.

14. The image processing apparatus of claim 9, wherein the index data corresponds to features of the geolocated images.

15. The image processing apparatus of claim 14, wherein the features are selected from the set consisting of corners, edges or lines, brightness information and histogram information.

16. A tangible memory on which computer-readable instructions of a computer program are stored, the instructions, when executed by a processor, cause the processor to perform a method, the method comprising:

receiving an image request from a user device, the image request including an image of interest and location metadata for the image of interest;

analyzing the location metadata to select one or more cells to evaluate against the image of interest, each cell having one or more geolocated images and index data associated therewith;

for each selected cell, comparing the image of interest against the index data of that cell;

identifying any matches from the geolocated images of the selected cells based on the compared index data; and providing the matches;

wherein the matches are provided along with a match confidence indicator that identifies a likelihood or accuracy of each match; and wherein a value of the match confidence indicator depends on geolocation verification between the location metadata and location information for the geolocated images of the selected cells.

17. The tangible memory of claim 16, wherein updated location metadata for the image of interest is provided to the user device along with the matches.

18. The tangible memory of claim 16, wherein the index data is stored in an index storage server, and the index data for each selected cell is accessed with a key representing that cell's unique ID.

19. The tangible memory of claim 16, wherein the index data corresponds to features of the geolocated images.

20. The tangible memory of claim 19, wherein the features are selected from the set consisting of corners, edges or lines, brightness information and histogram information.

\* \* \* \* \*